United States Patent Office 3,796,777
Patented Mar. 12, 1974

3,796,777
METHOD OF MAKING HOLLOW SPHERES BY SPRAY DRYING
David I. Netting, Springfield, Pa., assignor to Philadelphia Quartz Company, Philadelphia, Pa.
No Drawing. Filed Feb. 3, 1972, Ser. No. 223,313
Int. Cl. B01j 2/04
U.S. Cl. 264—13                                                    7 Claims

ABSTRACT OF THE DISCLOSURE

The invention relates to a process for the manufacture of an economical filler of low bulk density that is especially useful for incorporation in unsaturated polyester systems and which does not react with the components of the unsaturated polyester system. Solutions of sodium silicate and ammonium pentaborate are mixed, spray dried, and the product from the spray drier is then further dried to a water content below about 7%.

BACKGROUND

Prior art workers have devised a number of different ways of producing fillers that consist of a mass of small hollow spheres. Such products have been produced from both organic and inorganic chemicals (as well as mixtures thereof) and vary in density, size, strength, chemical characteristics and utility. Although the primary use for such spheres have been as fillers, they also have a number of other uses, such as an insulation material. Some of these prior art processes utilize spray drying techniques.

The following patents are of some interest relative to the formation of particles of organic and inorganic material and may be of background interest: 1,724,185; 1,734,260; 1,842,083; 1,977,325; 2,047,016; 2,101,635; 2,117,605; 2,151,083; 2,202,481; 2,209,451; 2,209,678; 2,211,429; 2,275,164; 2,310,343; 2,448,280; 2,576,977; 2,582,852; 2,611,712; 2,652,371; 2,759,843; 2,797,139; 2,797,140; 2,797,141; 2,797,201; 2,822,238; 2,828,261; 2,833,296; 2,883,347; 2,913,486; 2,978,399; 2,978,340; 3,030,215; 3,086,898; 3,129,086; 3,133,821; 3,183,107; 3,230,064; 3,230,184; 3,247,158; 3,256,105; 3,278,660; 3,316,139; 3,365,315; 3,420,645; 3,458,332.

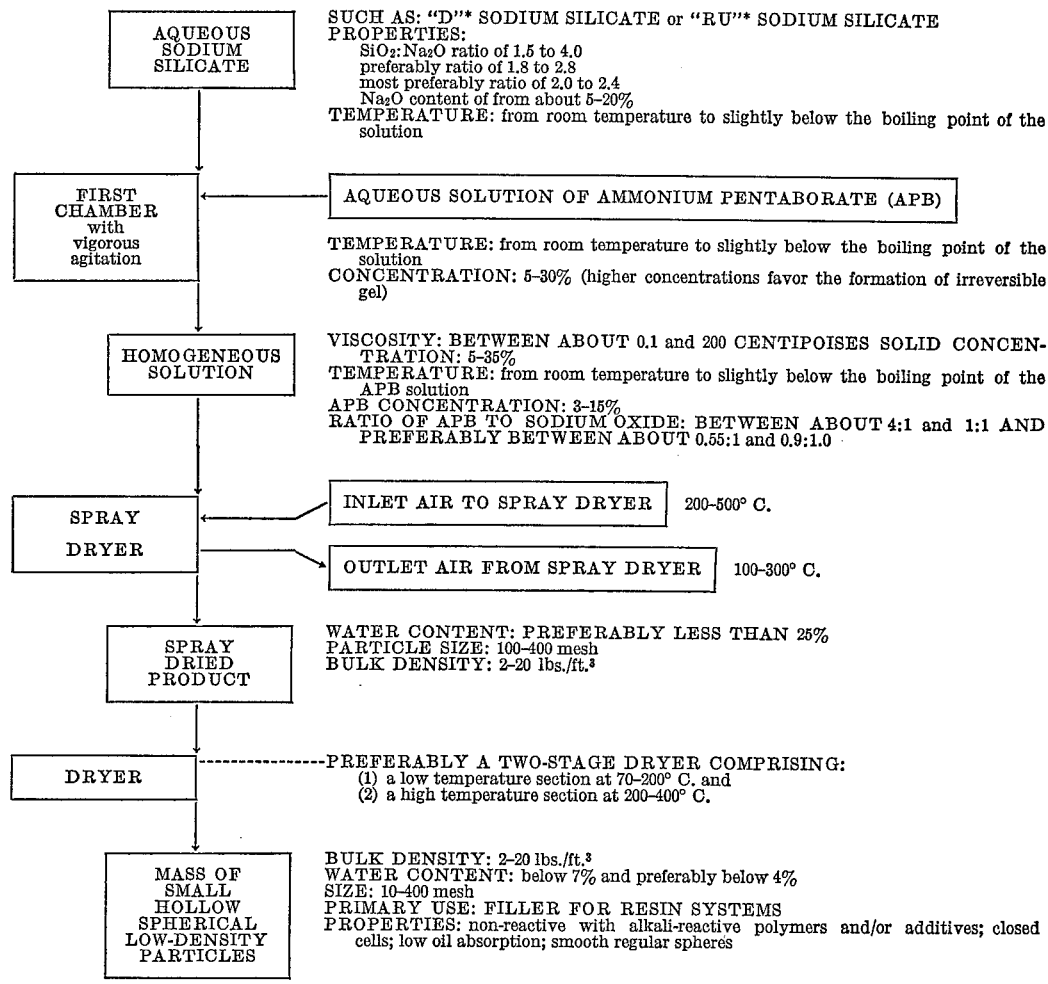

AQUEOUS SODIUM SILICATE
SUCH AS: "D"* SODIUM SILICATE or "RU"* SODIUM SILICATE
PROPERTIES:
  $SiO_2:Na_2O$ ratio of 1.5 to 4.0
  preferably ratio of 1.8 to 2.8
  most preferably ratio of 2.0 to 2.4
  $Na_2O$ content of from about 5-20%
TEMPERATURE: from room temperature to slightly below the boiling point of the solution FIRST CHAMBER with vigorous agitation ← AQUEOUS SOLUTION OF AMMONIUM PENTABORATE (APB)
TEMPERATURE: from room temperature to slightly below the boiling point of the solution
CONCENTRATION: 5-30% (higher concentrations favor the formation of irreversible gel)

HOMOGENEOUS SOLUTION
VISCOSITY: BETWEEN ABOUT 0.1 and 200 CENTIPOISES SOLID CONCENTRATION: 5-35%
TEMPERATURE: from room temperature to slightly below the boiling point of the APB solution
APB CONCENTRATION: 3-15%
RATIO OF APB TO SODIUM OXIDE: BETWEEN ABOUT 4:1 and 1:1 AND PREFERABLY BETWEEN ABOUT 0.55:1 and 0.9:1.0

SPRAY DRYER
INLET AIR TO SPRAY DRYER    200-500° C.
OUTLET AIR FROM SPRAY DRYER    100-300° C.

SPRAY DRIED PRODUCT
WATER CONTENT: PREFERABLY LESS THAN 25%
PARTICLE SIZE: 100-400 mesh
BULK DENSITY: 2-20 lbs./ft.³

DRYER ---------PREFERABLY A TWO-STAGE DRYER COMPRISING:
  (1) a low temperature section at 70-200° C. and
  (2) a high temperature section at 200-400° C.

MASS OF SMALL HOLLOW SPHERICAL LOW-DENSITY PARTICLES
BULK DENSITY: 2-20 lbs./ft.³
WATER CONTENT: below 7% and preferably below 4%
SIZE: 10-400 mesh
PRIMARY USE: FILLER FOR RESIN SYSTEMS
PROPERTIES: non-reactive with alkali-reactive polymers and/or additives; closed cells; low oil absorption; smooth regular spheres

* Registered trademarks of Philadelphia Quartz Company for sodium silicates defined hereafter.

THE PRESENT INVENTION

The present invention is directed to an inexpensive method for producing small increments or particles of inorganic materials that are essentially in the form of hollow spheres and that are especially useful as fillers in plastic compositions. Considered from one aspect, the method of the present invention can be exemplified by the following sequence of steps (which may be considered in conjunction with the attached flow sheet). (The percentages are by weight unless otherwise specified.)

(a) providing a first aqueous solution consisting essentially of sodium silicate that is characterized by a $SiO_2:Na_2O$ mol ratio of between about 1.5:1 and 4.0:1; and an $Na_2O$ content of 5 to 20%;
(b) providing a second aqueous solution consisting essentially of ammonium pentaborate having a concentration within the range of about 5–30%;
(c) bringing said first and second solutions set forth in (a) and (b) together in a first chamber in such a way that said second solution is brought into intimate admixture with said first solution with such speed and efficiency that the formation of localized pockets of irreversible gel is substantially avoided;
(d) withdrawing a liquid stream from said first chamber before the contents of said first chamber, at a solids content of about 5% to about 35%, have had a chance to form any substantial amounts of an irreversible gel, the temperature of said withdrawn liquid stream being between about room temperature and a temperature slightly below the boiling point of the liquid stream;
(e) spray drying the liquid stream set forth in (d) and recovering a spray dried product, that consists essentially of a mass of small hollow spheres;
(f) subjecting the spray dried product of (e) to further drying at a temperature within the range of 70–400° C. for a time sufficient to reduce the moisture content below about 7%; and
(g) recovering a mass of generally hollow spherical particles having a bulk density of about 2–20 lbs./ft.$^3$; a particle size within the range of 10–400 mesh; and a water content of 0–7%.

While the $SiO_2:Na_2O$ range set forth in step (a) is quite satisfactory, I prefer to work within a $SiO_2:Na_2O$ ratio range of 1.8 to 2.8, and the range of 2.0 to 2.4 is especially preferred. The viscosity of the sodium silicate is not critical, the main requirement being that it not be so thick that it is difficult to mix with the pentaborate. The temperature of the aqueous sodium silicate may be at any temperature between room temperature and a little below the boiling point of the solution.

The concentration of the aqueous ammonium pentaborate solution should usually be within the range of from about 5% to about 30% by weight. If higher concentrations are used it is difficult to mix with the silicate solution without irreversible gel formation. Solutions of ammonium pentaborate are sufficiently reactive with the alkali to prevent discoloration of polyester resin compositions, and simple to prepare. The temperature of the aqueus ammonium pentaborate solution may be any temperature between room temperature and a little below the boiling point of the solution. Ammonium pentaborate has the formula $(NH_4)_2O \cdot 5B_2O_3 \cdot 8H_2O$ and consists of 9.6% $(NH_4)_2O$; 63.9% $B_2O_3$; and 25.6% $H_2O$. One of the functions of the ammonium pentaborate is to react with the sodium of the sodium silicate so as to reduce the alkalinity of the final product when it is used in alkali sensitive polymer solutions.

The ammonium pentaborate and sodium silicate may be brought together in any of several ways and the concentration of solids in the final homogeneous solution should preferably be within the range of about 5–35%.

In my work I have found it preferable to add the pentaborate solution to a tank containing the silicate solution. The temperature should be between about room temperature and below the boiling point of the homogeneous solution. In order to minimize or avoid irreversible gelation, the sodium silicate at the higher ratios of $SiO_2:Na_2O$ will require more dilution and lower concentrations of the pentaborate. I may add pentaborate as a hot 5–35% solution but I prefer to add warm ammonium pentaborate as a 10% solution to a sodium silicate solution and with sufficient agitation so as to avoid the formation of irreversible gel. The homogeneous solution preferably contains between about 3 and 15% of the pentaborate. Rather vigorous agitation is essential for the reason that if a high concentration of pentaborate salt is allowed to build up at any point, a gel will begin to precipitate. This should be avoided as much as possible. It is permisible to have very small particles of gel dispersed throughout the mixture so long as the gel particles do not form big enough lumps to condense and become non-dispersible (i.e. irreversible). (A "lump" is intended to mean a visible concentration of solid.) The APB/sodium oxide is between about .4:1 and 1:1 and preferably between about 0.55:1 and 0.9:1.

The liquid stream withdrawn from the aforesaid first chamber in step (d) preferably has a viscosity within the range of from about 0.1 to about 200 cp. and preferably contains about 3 to 15% of ammonium pentaborate.

Any of the available commercial spray drying systems may be used. The specific conditions of spray drying will of course vary with the particular spray dryer that is employed. Generally spray drying should be carried out at a temperature below the boiling point of the sprayed particles, i.e. to avoid intumescence. Nevertheless I can generally say that I prefer air inlet temperatures from about 200 to 500° C. and air outlet temperatures ranging from about 100 to about 300° C. It is important in setting the inlet temperature to avoid actually boiling the droplets as they enter the spray dryer. However, the temperature should be high enough to obtain at least a limited expansion of the droplets in the spray drying zone.

The solid products removed from the spray dryer must have less than about 25% and preferably less than about 20% water in order to avoid aggregation or sticking of one particle to another.

The final drying step (f) is carried out slowly to reduce the total moisture of the spray dried product to below about 7% and I prefer a moisture below about 4%. The final drying step does not change the bulk density significantly because whereas there is a loss of weight as the water is removed there is also a slight shrinkage of the particles. Any convenient drying means is acceptable. It is only necessary to avoid significant intumescence.

A preferred apparatus for carrying out the final drying step is a rotary dryer having a low temperature section (e.g. 70°–200° C. and most preferably about 150° C.) and a high temperature section (e.g. 200°–400° C. and most preferably about 300° C.), and wherein air is passed through the dryer concurrently or countercurrently with the material to be dried. The purpose is to reduce the water content below the amount which will react to discolor a polyester resin composition and to avoid further expansion of the particles.

The typical polyester resin compositions in which my product is particularly effective are those with unsaturated polyester resins which are polycondensation products of mainly unsaturated dicarboxylic acids and dihydroxy alcohols crosslinked with unsaturated monomers. The acids are usually maleic or fumaric and the crosslinkers are usually styrene or diallyl phthalate. They are polymerized ordinarily with either benzoyl peroxide or methyl ethyl ketone peroxide and a cobalt salt accelerator.

EXAMPLES

Some of the following examples are illustrative of some preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature, and the pressure is atmospheric, unless otherwise indicated.

The spray dryer employed in Examples 1–4 was a Nichols-Niro portable spray dryer of the centrifugal atomizer type.

Several commercial silicates have been used in the examples, such as "D" and "RU." These silicates are both made by the Philadelphia Quartz Company of Philadelphia, Pa., and this company is the owner of the trademarks "D" and "RU." The properties of "D" sodium silicate are: a $SiO_2/Na_2O$ ratio of 2.0, a $Na_2O$ content of 14.7%, a water content of 55.9% and a viscosity of 400 cp. The properties of "RU" sodium silicate are: a $SiO_2/Na_2O$ ratio of 2.4, a $Na_2O$ content of 13.9%, a water content of 52.9% and a viscosity of about 2100 cp.

Example 1

500 parts by weight of "D" sodium silicate at room temperature were slowly and thoroughly mixed with a warm aqueous solution containing 450 parts by weight of water and 50 parts by weight of ammonium pentaborate in a tank. The water used to dissolve the pentaborate was first heated to above about 60° C. The two were agitated together until all lumps were dispersed and dissolved, i.e. about 5 to 10 minutes. There was a strong odor of ammonia released as the reaction proceeded.

The resulting homogeneous solution with a viscosity below about 200 cp. was removed from said tank and fed to a spray dryer. The inlet temperature of the air entering the spray dryer was between about 390° and 420° C. and the outlet temperature of the air leaving the spray dryer was between about 140–160° C. The atomization pressure was 6 kg./cm.² The product from the spray dryer had the following analysis:

$SiO_2$ ------------------------------ 50.8%.
$Na_2O$ ------------------------------ 25.4%.
$B_2O_3$ ------------------------------ 11.6%.
$H_2O$ ------------------------------ 12.2%.
Average particle size --------------- Minus 50 to plus 200 mesh.
Bulk density ---------------------- 12 lbs./ft.³

The solid product recovered from the spray dryer was then dried in an oven in which the initial temperature was below about 100° C. and gradually the temperature was raised to about 300° C. over about one hour.

The product taken from the oven had the following properties:

$SiO_2$ ------------------------------ 56%.
$Na_2O$ ------------------------------ 28%.
$B_2O_3$ ------------------------------ 12.7%.
$H_2O$ ------------------------------ 3.3%.
Bulk density ---------------------- 12 lbs./ft.³
Average particle size --------------- Minus 50 to plus 200 mesh.

When the same experiment was carried out except that the spray drying was carried out at an atomization pressure of 2 kg./cm.², the bulk density was 5.3 lbs./ft.³ Thus, in general, lower atomization pressures will result in a lower bulk density.

Ten parts of product from the oven (having a bulk density of 12 lbs./ft.³) were mixed with 100 parts by weight of a typical polyester resin [Polylite 32-353 from Reichhold Chemical Company]. The resin color was unaffected. The casting density was 57 lbs./ft.³ and changed little in 24 hours showing that the filler was essentially free of holes. The color of the casting was white when fresh and was grey after 24 hours.

Example 2

In another experiment, which was like Example 1 except that 600 parts by weight of the ammonium pentaborate solution was mixed with the 500 p.b.w. of "D" silicate; and the liquid material withdrawn from the tank was spray dried at an atomization pressure of 2 kg./cm.². The bulk density of the product from the spray dryer was 5 lbs./ft.³. After final drying at 300° C., the resulting filler material was mixed with a polyester resin as in Example 1 and was found to have a high viscosity, i.e. about 2500 cp. The casting density was 45 lbs./ft.³ and the color was white even after 24 hours. This shows that with sufficient ammonium pentaborate the alkali and water do not react with the polyester composition.

Example 3

With the same mixtures as in Example 2 spray dried at 6 kg./cm.², the bulk density was 9.2 lbs./ft.³. After drying finally at 300° C., the resulting material was mixed with a polyester composition as in Example 1 and was found to have a low viscosity, i.e. about 1000 cp. The casting density was 63 lbs./ft.³ and after 24 hours the product was still white.

Casting density depends on the particle size as well as the density of the filler. A filler made in about the same way as in Example 3, which had a bulk density of 8.2 had the following particle size distribution and gave the following casting densities when used at 10 grams of filler per 100 grams of the resin of Example 1;

Lbs./ft.³
−48 +100 M ---------------------------------- 59.5
−100 +150 M ---------------------------------- 46.2
−150 +200 M ---------------------------------- 46.9
−200 +270 M ---------------------------------- 59.3
−270 +325 M ---------------------------------- 59.3
−325 M ---------------------------------- 66.3

Example 4

Some experiments were carried out with varying weight ratios of ammonium pentaborate to sodium silicate (i.e. a varying $APB/Na_2O$ ratio). The results of these experiments are set forth in Table I below.

TABLE I

| Parts by weight of— | | | Ratio of APB/Na₂O | Extent of reaction of resulting mixtures with polyester resin |
|---|---|---|---|---|
| Sodium silicate | APB | H₂O | | |
| "D": | | | | |
| 100 | 8 | 72 | 0.54 | Moderate. |
| 100 | 10 | 90 | 0.68 | Slight. |
| 100 | 12 | 108 | 0.81 | Very slight. |
| 100 | 14 | 126 | 0.95 | Gelled the silicate. |
| "RU": | | | | |
| 100 | 6 | 54 | 0.43 | Moderate. |
| 100 | 8 | 72 | 0.57 | Slight. |
| 100 | 10 | 90 | 0.72 | Very slight. |
| 100 | 12 | 108 | 0.87 | Do. |
| 100 | 13 | 117 | 0.95 | Gelled the silicate. |

These experiments show that at this concentration when the $APB/Na_2O$ ratio is below about 0.55 there will be a moderate reaction with polyester resin and at a ratio above about 0.90 the incidence of gel formation increases and prevents satisfactory particle formation. At greater dilutions, the ratio may be increased above 0.90.

The following Table II shows the relationship between the water content of my final product prepared as in Example 1 and the degree to which that product will react with a polyester resin.

TABLE II

Ignition loss, percent:     Reaction with resin
10 ---------------------------------- High.
7.5 ---------------------------------- Do.
5.8 ---------------------------------- Moderate.
4.7 ---------------------------------- Slight.
3.4 ---------------------------------- Very slight.
2.2 ---------------------------------- No reaction.

It is thus seen that I prefer my final product to have a water content below about 7% and preferably below 4%.

I also conducted some experiments to show the influence of the concentration of the fluid fed to the spray dryer upon the spray dryer itself. Pertinent data relative to these experiments are set forth in Table III.

TABLE III

| Parts by weight of— | | | Appearance of product | Atomization wheel conditions |
|---|---|---|---|---|
| "D" | APB | Water | | |
| 100 | 10 | 120 | Normal | Clean. |
| 100 | 10 | 100 | ...do... | Do. |
| 100 | 10 | 90 | ...do... | Do. |
| 100 | 10 | 80 | ...do... | Do. |
| 100 | 10 | 70 | ...do... | Some filamentation. |
| 100 | 10 | 60 | ...do... | More filamentation. |
| 100 | 10 | 50 | ...do... | Bad filamentation. |

Example 5

A mixture comprising 50% "D" sodium silicate, 5% ammonium pentaborate and 45% water (with an overall solids content of 25%) was fed to a centrifugal spray dryer having a 7 ft. diameter and a stainless steel 70° conical bottom with a single bottom outlet, 3,500 c.f.m. air flow and cyclone collection (as sold by the Bowen Engineering Co.). This feed material, having a viscosity of below 100 cp. was fed to the atomizer at room temperature at an average feed rate of 7.7 lbs. per minute, with a dryer air inlet temperature of 500° F. (260° C.) and an air outlet temperature of 325° F. (163° C.) using direct gas heat. The centrifugal atomizer had a 5 inch vane and the atomizing force was 21,000 r.p.m. The product recovered had a bulk density of 5 lbs./ft.$^3$ and an ignition loss of 13.6%. The true density by pycnometer was 29 lbs./ft.$^3$.

This spray dried product was then further dried by heating a layer of about one inch thickness at 1000° C. for one hour in an oven, whereafter the temperature was raised to 225° C. for one hour, and finally to 300° C. for one hour. The thus dried product had a bulk density of 3.4 lbs./ft.$^3$, a true density of 29 lbs./ft.$^3$, an ignition loss of 3.5% and the following Tyler screen analysis:

|  | Percent |
|---|---|
| +50 M | 0.3 |
| −50 M+80 M | 5.2 |
| −80 M+100 M | 12.4 |
| −100 M+140 M | 22.1 |
| −140 M+325 M | 49.3 |
| −325 M | 10.7 |

A typical polyester resin, Marco #GR 17041 (distributed by W. R. Grace Co.) when filled at 8% filler loading with this product had a cast density of 54.6 lbs./ft.$^2$ and at 10% filler loading 52.7 lbs./ft.$^3$. The viscosity before casting was 1200 cp. at 8% and 2700 cp. at 10%.

Utility

As indicated earlier, my invention is particularly useful as a filler, and particularly as a filler for simulated wood. Wood used in furniture manufacturing has a density of about 30–45 lbs./ft.$^3$ and is strong and versatile. However, quality wood is becoming scarce and skilled craftsmen capable of carving furniture parts get very high wages. As a consequence the furniture industry is being forced into the use of synthetics. There are three basic competitors for this furniture market: polyurethane foam, injection molded polystyrene, and the unsaturated polyesters. The injection molded polystyrene requires a very large capital investment, but is good for mass production of many parts. Molded polyurethane foam is widely used in the industry but molded parts must be made with a very low density (25–28 lbs./ft.$^3$) to make them economical because of the high cost per pound of polyurethane. The low density makes the polyurethane foam unusable for many structural parts. Unsaturated polyester resins are very well suited for all furniture parts, but their high density (70–80 lbs./ft.$^3$) puts them at an economical disadvantage despite their low price. A low cost, low density, filler is therefore needed to reduce the cost per cubic foot of polyester resin and at the same time make the polyester parts have about the same density, feel, sound and appearance as wood. The lightweight filler must not absorb the resin or react with the resin.

This invention is especially related to fillers for polyesters and especially unsaturated polyesters. In more general terms, I use my product as a filler for thermosetting polymers such as the polyesters, the epoxys, phenolformaldehyde and also for latexes such as silicone latex. It also may be used for compositions of thermoplastics which are later molded by raising the temperature.

In summary then, the advantages of the product of my invention, when used as an extender or filler are as follows:

(1) low cost;
(2) non-reactive with alkali-reactive polymers and additives;
(3) low oil absorption;
(4) free from holes large enough to absorb any significant amount of resin;
(5) spheres having a film strength sufficient to retain their shape and avoid breakage when incorporated in viscous resin formulations.

Possible modifications of the invention

When a patent eventually issues to one company, it sometimes happens that a competing company will take the position that the patent does not cover what the competing company is doing on the grounds that what the competing company is doing is not specifically spelled out in the patent. In such a situation the competing company will often try to argue that the slightly different procedure that the competing company is using was not even contemplated by the inventors. Although the courts will usually apply the "doctrine of equivalents" in such situations to protect the patent owner, the court itself is often in at least some doubt as what possible modifications the inventor did have in mind. Accordingly, it is believed that it would be worthwhile to set forth here some of the *possible* substitutions of materials and alternative procedural steps that I believe would readily suggest themselves to those skilled in this art.

First of all, I think that one skilled in the art might be inclined to try to substitute potassium silicate for the sodium silicate set forth in step (a). If a potassium silicate is used, the ratio of $SiO_2/K_2O$ can be within the range of 1.5:1 to 4.2:1.

Secondly, I think one skilled in the art might be inclined to try to combine steps (a), (b) and (c) above into a single step by introducing the silicate, pentaborate and water into a single reaction or mixing zone so as to end up with the same product that is set forth in step (d) above.

Thirdly, I think one engaged in this art might be inclined to try to substitute for the ammonium pentaborate of step (b) a polysalt that would be colloidal, not cause coacervation, and which would not react too rapidly to reduce the alkalinity of the alkali silicate. While some polysalts might be workable, I have found that borax, boric acid, trisodium phosphate, ammonium phosphate, ammonium oxalate, ammonium phosphate, ammonium chloride, ammonium carbonate and dibasic calcium phosphate are not very satisfactory.

Fourthly, I think one skilled in the art might try to use a drying temperature that is outside of the range set forth in step (f), possibly in conjunction with somewhat different ratios or percentages than are set forth in steps (a)–(e), in order to find a suitable combination of parameters that would fall outside the scope of the claims. Such experimentation, even if successful, would obviously not depart from the basic concept of the invention.

Accordingly, it should be understood that I do not consider that any such departures from the very specific parameters set forth in the claims are in any way a departure from the inventive concept that I have disclosed, and I intend to rely upon the well-known doctrine of equivalents insofar as any such departures are concerned.

The ratios are by weight unless otherwise indicated.

What I claim is:

1. A method of producing hollow spheres having a size of 10–400 mesh and being free from holes, comprising:
   (A) mixing in a chamber:
      (1) a first aqueous solution consisting essentially of sodium silicate having a $SiO_2:Na_2O$ mole ratio of 1.5:1 to 4.0:1 and an $Na_2O$ content of 5 to 20% on a weight basis, maintained at a temperature between room temperature and the solution boiling point, and
      (2) a second aqueous solution consisting essentially of 5 to 30% ammonium pentaborate on a weight basis, maintained at a temperature between room temperature and the solution boiling point,
   to produce with agitation a homogeneous third aqueous solution having a solids concentration of 5 to 35%, an ammonium pentaborate concentration of 3 to 15% and a weight ratio of ammonium pentaborate to sodium oxide of 0.55:1 to 0.9:1, maintained at a temperature below said third solution boiling point;
   (B) spraying droplets of said third aqueous solution into a dryer utilizing air having an inlet temperature between 200° C. and 500° C. while maintaining said droplets entering said dryer at a temperature below said third solution boiling point and recovering a product consisting essentially of a mass of hollow spheres having a water content less than 25%;
   (C) subjecting said spray dried product to further drying at a temperature between about 70°–400° C. for a time sufficient to reduce the moisture content below about 7% and avoiding intumescence; and
   (D) recovering a mass of generally hollow closed spherical particles having a bulk density of about 2–20 lbs./ft.$^3$ and a particle size within the range of 10–400 mesh.

2. A method according to claim 1 wherein said homogeneous third solution has a viscosity of 0.1 to 200 cp.

3. A method according to claim 1 wherein the spheres recovered in step (B) have a water content of less than 20%.

4. A method according to claim 1 wherein the product recovered in step (C) has a moisture content below 4%.

5. A method according to claim 1 wherein the drying step (C) is carried out in two stages including a first stage maintained at a temperature between 70° and 200° C. and a second stage maintained at a temperature between 200° and 400° C.

6. A method according to claim 1 wherein the aqueous sodium silicate solution has a $SiO_2:Na_2O$ ratio of between about 1.8:1 and 2.8:1.

7. A method according to claim 1 wherein the aqueous sodium silicate solution has a $SiO_2:Na_2O$ ratio of between about 2.0:1 and 2.4:1.

References Cited

UNITED STATES PATENTS 3,347,798    10/1967    Baer et al. _____ 264—13

DONALD J. ARNOLD, Primary Examiner

J. R. HALL, Assistant Examiner